United States Patent Office 3,794,696
Patented Feb. 26, 1974

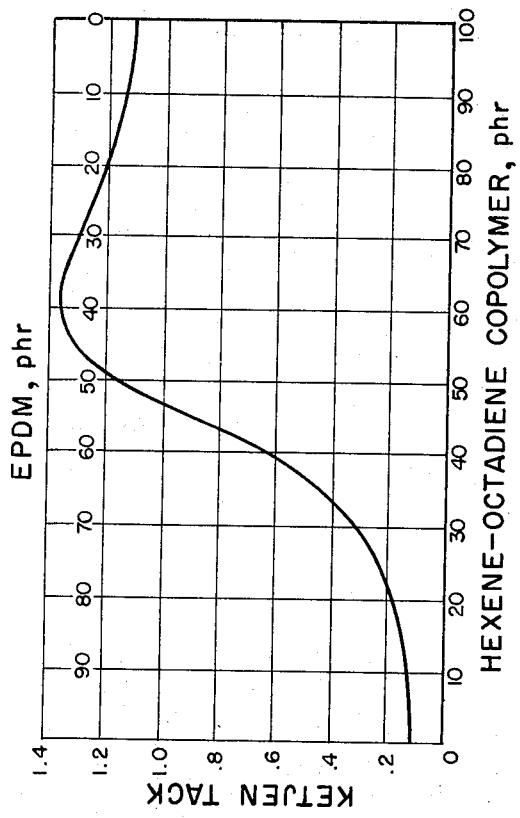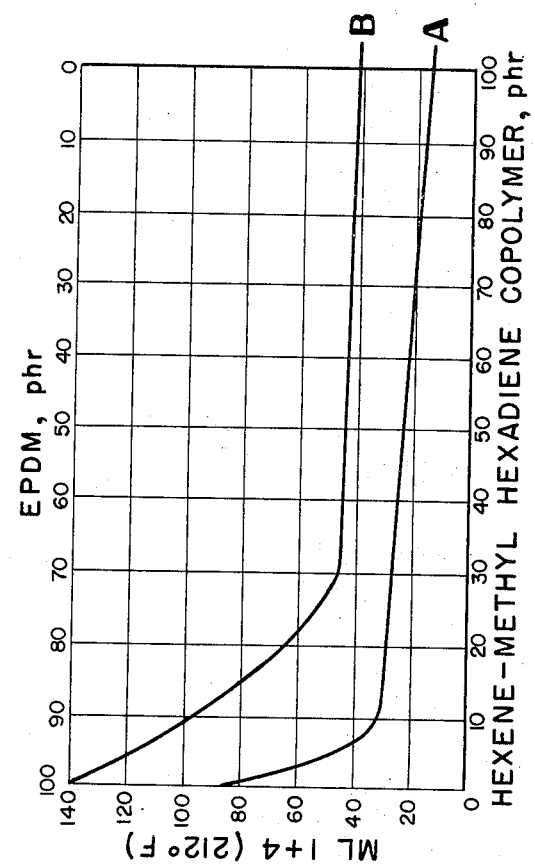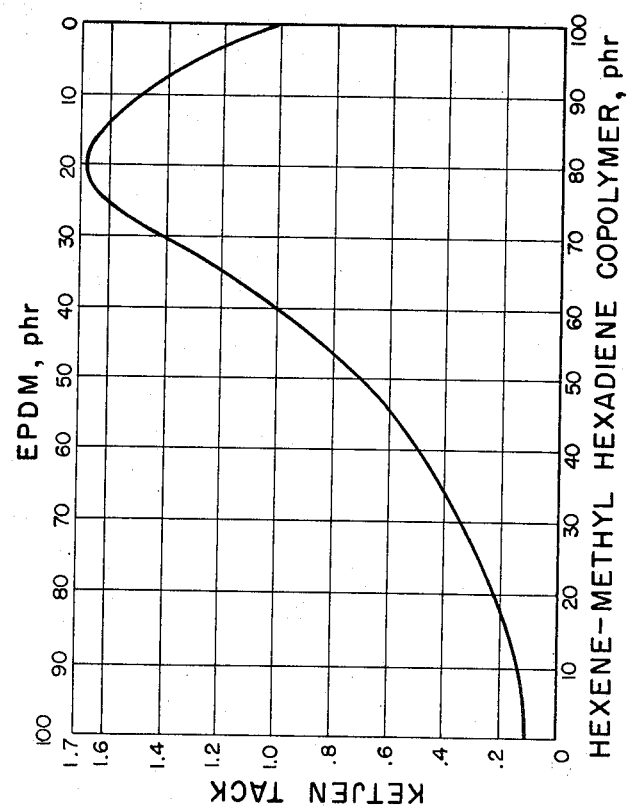

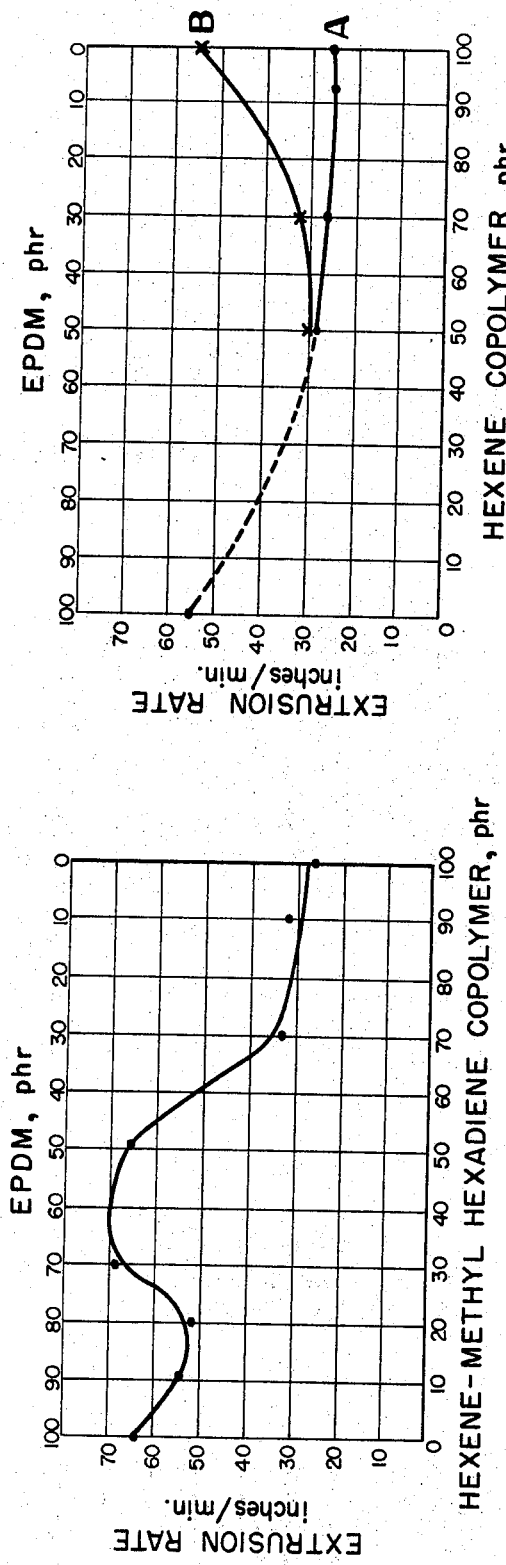
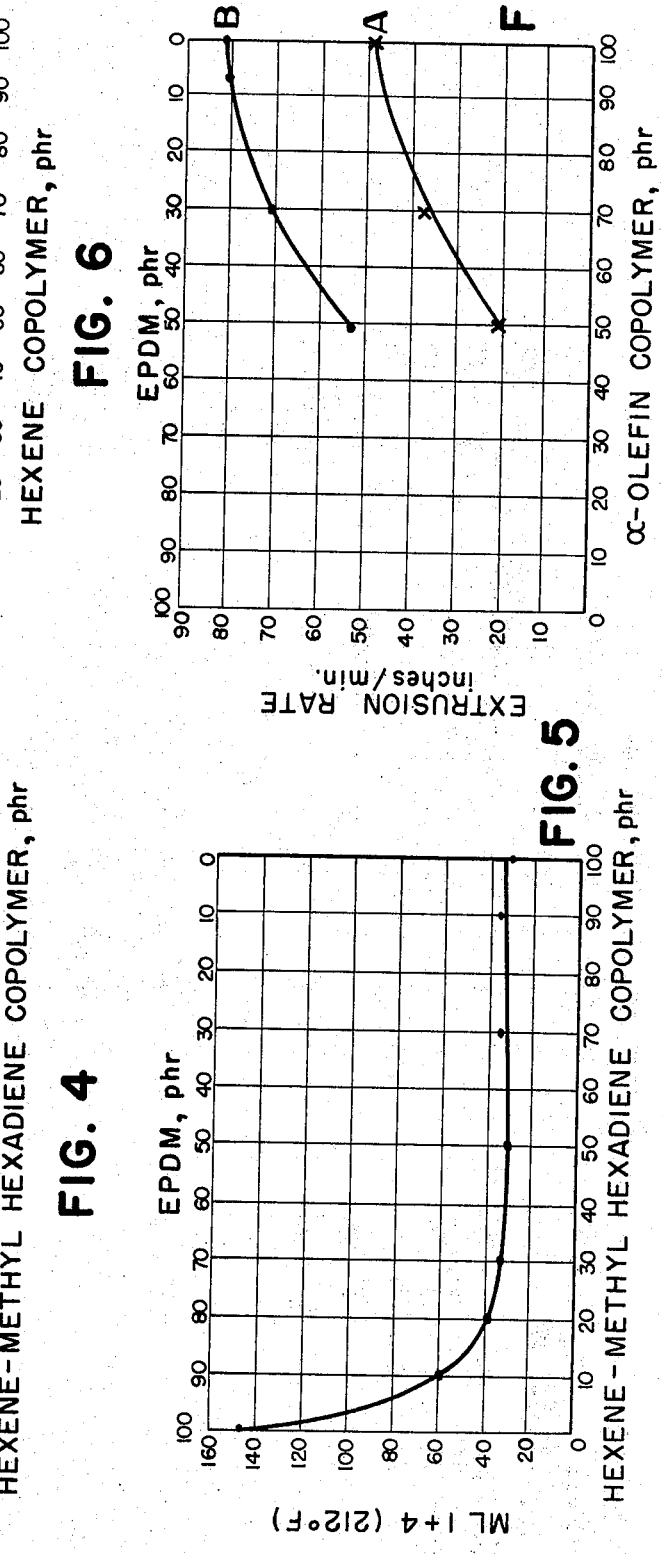
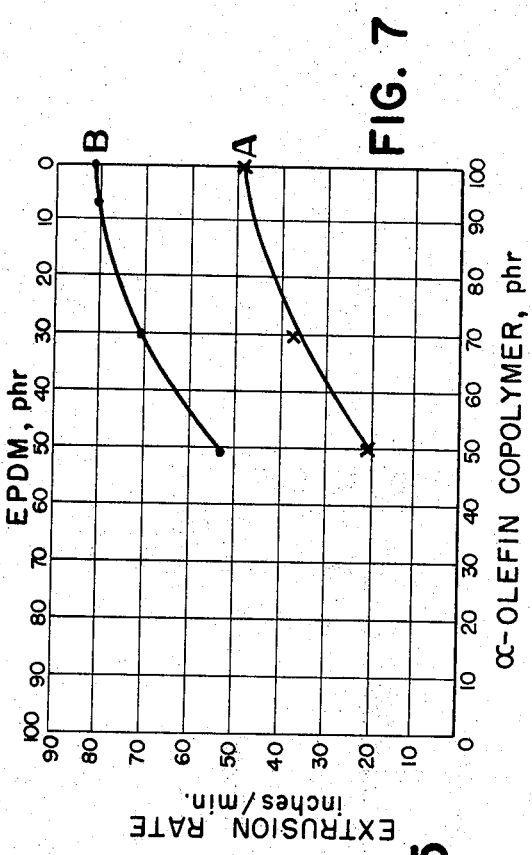

3,794,696
BLENDS OF ETHYLENE-PROPYLENE RUBBERS AND $C_5$–$C_{10}$-ALPHA-OLEFIN POLYMERS
Joginder Lal, Akron, and Paul H. Sandstrom, Tallmadge, Ohio, assignors to The Goodyear Tire & Rubber Company, Akron, Ohio
Filed July 1, 1971, Ser. No. 158,716
Int. Cl. C08f 29/12
U.S. Cl. 260—897 A                    11 Claims

ABSTRACT OF THE DISCLOSURE

Blends of ethylene-propylene rubber (EPM) or ethylene-propylene-diene rubber (EPDM) with polymers of $C_5$–$C_{10}$ α-olefin or polymers of (a) at least 80% of a $C_5$–$C_{10}$ α-olefin and (b) up to 20% of a $C_5$–$C_{30}$ nonconjugated diene or polyene (when employing a sulfur cure) result in rubber compounds possessing tack, extrudability, and/or processibility superior to that of either component. The weight ratio of EPM or EPDM to such polymer is between 95:5 and 5:95.

---

This invention relates to certain synthetic rubber stocks which possess excellent processing characteristics and to a method of altering the building tack, extrudability, and/or processibility of such stocks. More particularly, it relates to an improved rubber blend comprising ethylene-propylene rubber blended with either a rubbery polymer of an α-olefin (for peroxide cure) or a polymer containing a major portion of such α-olefin and a minor portion of a nonconjugated diene (for sulfur cure).

DEFINITIONS

"Ethylene-propylene rubber" means a polymer consisting of EPM and/or EPDM.

"EPM" means an ethylene-propylene rubber containing from about 20 to 75 weight percent of ethylene and from about 80 to 25 weight percent propylene.

"EPDM" means an ethylene-propylene-diene rubber containing from about 20 to 75 weight percent ethylene, from about 80 to 25 weight percent propylene, and a minor proportion of from about 1 to 15 weight percent of a $C_5$–$C_{30}$ nonconjugated diene.

"phr." means parts per hundred total rubber, by weight.

"Ketjen tack" means that value of tack as measured on a Ketjen Tackmeter.

BACKGROUND

"Building tack" is generally understood to refer to the surface property of rubber which enables two pieces of unvulcanized rubber stock to adhere together when brought in contact under moderate pressure. It is generally measured by the amount of force required to separate two pieces of such rubber stock during a short period of time. One convenient method of evaluating building tack is by the use of a Ketjen Tackmeter. Tack is an important and necessary property of various rubber stocks in their uncured state in order that they may be commercially useful in the manufacture of tires, industrial products, rubberized fabrics and adhesives and, where the natural tack of a rubber stock is insufficient, some procedure, generally the addition of a compound referred to as a tackifier, must be carried out to increase the building tack to an acceptable level. The problem of an acceptable tack, while a matter of concern with all rubber products, is particularly evident in certain synthetic rubber stocks which have little inherent building tack.

It is well known that ethylene-propylene rubbers offer many superior qualities, particularly excellent resistance to ozone and aging, and good flex properties, abrasion resistance, and tensile strength. In addition, these elastomers have high molecular weight and may be heavily extended with filler and/or extending oil in the interest of economy and imparting certain desirable properties to the finished product. However, the lack of building tack in these rubbers constitutes a serious limitation in many applications and especially where successive laminations are employed in constructions such as belts.

"Extrudability" is another important characteristic of a rubber which is to be employed in manufacturing operations where the rubber must be extruded to form the precured manufactured item. A rubber which extrudes poorly will exit an extrusion die with ragged edges resulting in either rejects or an excessive and costly trim problem. A standardized method for the evaluation of extrudability is set forth in ASTM D-2230. Ethylene-propylene rubber also exhibits certain extrusion deficiencies.

"Processability" is another important characteristic of a rubber and refers to the ability to mill or "band" a rubber on a rubber mill. A rubber which does not possess this characteristic will not work well on the mill and may, for example, crumble and fall off the mill rolls or possess an uneven surface and ragged edges.

INVENTION

Applicants have now discovered that when EPM or EPDM is blended with a rubbery polymer prepared from at least one $C_5$–$C_{10}$ α-olefin (where a peroxide cure is anticipated) or a polymer formed by polymerizing at least one such $C_5$–$C_{10}$ α-olefin together with at least one $C_5$–$C_{30}$ nonconjugated diene or polyene (where a sulfur cure is anticipated), the tack, extrudability, and/or processibility of the resulting blend is dramatically increased in a non-additive manner.

It will be apparent to persons familiar with EPM or EPDM rubber that where the rubbery polymer of α-olefin and nonconjugated diene is compounded with the EPDM, a sulfur cure may be employed and will generally be preferable. Where, however, the rubbery polymer of either α-olefin alone or α-olefin and nonconjugated diene is employed with EPM, or where the rubbery polymer of α-olefin is compounded with EPDM, a peroxide cure will be required.

When ethylene-propylene rubbers are blended with between 5–50 phr. of such rubbery polymers of α-olefin (as described above), the blend stocks exhibit superior processibility particularly on a 2-roll mill and enhanced extrudability as compared with the corresponding stock prepared without the addition of such α-olefin polymer. The blends also possess significantly lower Mooney viscosity and thus require a lower power consumption for mixing, for instance in a Banbury, and other similar operations.

Conversely, when polymers of such α-olefin are blended with between 5–50 phr. of ethylene-propylene rubbers, the blend stocks exhibit superior extrudability, particularly low die swell and porosity, as compared with those obtained without the addition of ethylene-propylene rubbers. The addition of 20–40 phr. of ethylene-propylene rubbers (depending on the particular α-olefin polymer) also improves tack as compared to the value of the α-olefin polymer in the absence of the ethylene-propylene rubber (see FIGS. 1 and 2).

RUBBERY POLYMER

The rubbery polymer employed in the practice of the invention is either a polymer of at least one $C_5$–$C_{10}$ α-olefin (or mixtures thereof) or a polymer of (a) at least 80 weight percent of at least one $C_5$–$C_{10}$ α-olefin (or mixtures thereof) and (b) up to 20 weight percent of at least one $C_5$–$C_{30}$ nonconjugated diene or polyene (or mixtures thereof). The ratio of EPM or EPDM rubber to the polymer is between about 95:5 and 5:95. A ratio of between about 80:20 and 20:80 gives excellent results. Where the basic rubber is EPM and therefore requires a peroxide cure for vulcanization, a $C_5$–$C_{10}$ α-olefin polymer alone may be employed rather than the polymer of α-olefin and nonconjugated diene, since the unsaturation in the polymer containing the nonconjugated diene is introduced for the purpose of permitting a sulfur cure. It is evident, however, that such polymer containing the nonconjugated diene would function in the practice of the invention with EPM. Where the basic rubber is EPDM, a polymer containing (a) at least 80 weight percent of $C_5$–$C_{10}$ α-olefin and (b) up to 20 weight percent of $C_5$–$C_{30}$ nonconjugated diene or polyene may be employed to permit the sulfur cure.

Typical examples of EPDM are terpolymers of ethylene, propylene, and a suitable diene such as 1,4-hexadiene, dicyclopentadiene, ethylidene norbornene, or methylene norbornene. EPDM rubbers used for preparing blends in the practice of this invention were "Nordel 1070" (T.M. DuPont Co.) and "Vistalon 6505" (T.M. Enjay Co.), while EPM rubber employed was "EPR 404" (T.M. Enjay Co.).

Typical examples of $C_5$–$C_{10}$ α-olefin are 1-pentene, 1-hexene, 1-octene, and 1-decene.

Typical examples of a $C_5$–$C_{30}$ nonconjugated diene and polyenes are 1,4-pentadiene, 1,4-hexadiene, 1,5-hexadiene (biallyl), 2-methyl-1,5-hexadiene, 4-methyl-1,4-hexadiene, 5-methyl-1,4-hexadiene, 3,3-dimethyl-1,5-hexadiene, 1,7-octadiene, 1,9-decadiene, 1,19-eicosadiene, 5-vinyl norbornene, 5-ethylidene norbornene, 5-(3-butenyl)-norbornene, and the like.

Blends of these monomers may be useful because of the availability or economics of the individual monomers. A particularly useful composition may be formed by blending (1) ethylene-propylene rubber with (2)(a) at least 80 weight percent of a polymer comprising a mixture of 1-pentene, 1-hexene, and 1-octene or 1-hexene, 1-octene, and 1-decene, and (b) up to 20 weight percent of a $C_5$–$C_{30}$ nonconjugated diene or polyene.

The practice of this invention is illustrated by reference to the following examples which are intended to be representative rather than restrictive of the scope of this invention.

EXAMPLE 1

Test sample preparation

The Ketjen tack values were measured for several blends of EPDM and a hexene copolymer. The EPDM and hexene copolymer were mixed with 50 phr. ISAF carbon black in separate Banbury batches. After addition of 5 phr. zinc oxide, 2 phr. sulfur, 0.5 phr. Captax, and 1 phr. Tuads to each black stock on a 2-roll mill, the compounded stocks were milled together so as to have designated proportions (FIGS. 1 and 2) of the two rubbers in the various blends. The stocks were sheeted out to 0.06" thickness and were subsequently cut into 1" x 9" sheeted test strips. The smoother side of the strip was reserved for tack measurement on a Ketjen Tackmeter. Test plies were made by covering the other side of the strip with masking tape.

Tack test conditions

Pressure = 2 atmospheres
Pressure Time = 30 sec.
Relaxation Time = 5 sec.
Separation Speed = 9"/min.
Effective Width = ⅛"

The plies were separated by means of a polyester film which had a ⅛" wide window.

Results

FIG. 1 shows the dependence of tack value of a blend on its composition. EPDM used here was "Nordel 1070" and the hexene copolymer was prepared from hexene and 3 mole percent methyl hexadiene, inherent viscosity 6.5 dl./g. The methyl hexadiene used here and in subsequent examples was an 80:20 mixture of 4- and 5-methyl-1,4-hexadienes. It is apparent that the tack value of the blend is not a linear function of its composition. The necessary amount of the hexene copolymer may be added to EPDM in order to obtain the tack desired for fabricating. FIG. 2 shows the dependence of tack values of another blend on its composition. EPDM used was "Nordel 1070," but the hexene copolymer was prepared from hexene and 3 mole percent 1,7-octadiene, inherent viscosity 3.0 dl./g. Polyhexene rubber, which is a homopolymer of 1-hexene, was found to be also effective in significantly increasing tack when blended with EPDM or EPM. For instance, a blend prepared from 70 phr. "Nordel 1070" and 30 phr. polyhexene (inherent viscosity 5.0 dl./g.) and compounded with 50 phr. ISAF black and 5 phr. zinc oxide exhibited Ketjen tack value of 0.35 as compared with the corresponding value of 0.1 for "Nordel 1070." Similarly, a blend prepared from 70 phr. "EPR 404" and 30 phr. polyhexene gave tack value of 0.55 as compared with the corresponding value of 0.45 for "EPR 404."

FIG. 3A shows the influence of a hexene copolymer (copolymer of hexene and 3 mole percent methyl hexadiene, inherent viscosity 6.5 dl./g.) on the Mooney Viscosity ML 1+4 (212° F.) (viscosity measured with a large rotor at 212° F., allowing sample to warm for one minute, followed by four minutes of mixing, ASTM D–1646) of its mill blends with EPDM containing no tackifier, compounding ingredients, or reinforcing agent. Data for FIG. 3B were obtained on the black stocks described in FIG. 1. Here again, the Mooney Viscosity is not a linear function of the blend composition.

EXAMPLE 2

The Banbury and milling behavior of several blends of EPDM and a hexene copolymer were determined. The EPDM (Nordel 1070) and the hexene copolymer (prepared from hexene and 4 mole percent methyl hexadiene; inherent viscosity 5.8 dl./g.) were mixed in the desired proportions with 50 phr. ISAF carbon black and 5 phr. zinc oxide in a Banbury. Conditions of Banbury mixing are given in Table I. Blend compositions containing 30 phr. or less of EPDM showed a weight loss of 22–48 grams (initial total weight: 1318 grams) due to the presence of loose carbon black during the Banbury mix cycle. The weight loss was significantly lower or essentially nil when 50 phr. or greater amount of EPDM was used. Blend compositions containing 50 phr. or more of the hexene copolymer exhibited some difficulty in removal from Banbury rotors, due to the higher inherent tack of these blends compared with those containing 30 phr. or lower amount of the hexene copolymer.

The blend compositions, after removal from Banbury, were each milled for one minute on an 8" diameter 2-roll mill. The EPDM stock exhibited ragged edges and a very uneven surface after milling. Blends containing increasing amounts of the hexene copolymer up to 50 phr., showed a gradual improvement of surface and edge smoothness, and also an increasing stickiness to the mill.

Stocks containing 50 phr. or more of the hexene copolymer had smooth edges and surfaces, and showed pronounced difficulty in removing from the mill due to their tackiness.

TABLE I
Banbury [a] mixing

| EPDM, phr. | Hexene copolymer, phr. | Final Temp., °F. | Final Wt., gms.[b] | Weight loss, gms. | Stickiness to rotors |
|---|---|---|---|---|---|
| 100 | 0 | 225 | ~1,318 | ~0 | None. |
| 90 | 10 | 265 | 1,314 | 4 | Do. |
| 80 | 20 | 249 | 1,317 | 1 | Do. |
| 70 | 30 | 240 | ~1,318 | ~0 | Slight. |
| 50 | 50 | 225 | 1,310 | 8 | Moderate. |
| 30 | 70 | 230 | 1,296 | 22 | Heavy. |
| 10 | 90 | 230 | 1,270 | 48 | Do. |
| 0 | 100 | 237 | 1,284 | 34 | Do. |

[a] Initially at room temperature; 5 min. mix cycle at 50 r.p.m.
[b] Initial weight of all batches was 1,318 gms.

EXAMPLE 3

The extrudability of several blends of EPDM and a hexene copolymer, described in Example 2, was determined. The blends were extruded through a Garvey die (ASTM Method D–2230) with an NRM extruder (25 r.p.m.; Barrel and head temperature 250° F.). A comparison of the extrusion rates of the various blend compositions is shown in FIG. 4. A nonlinear relationship exists between the extrusion rate and the blend composition. This type of behavior is not predictable. A comparison of the Garvey die ratings of the extruded stocks is shown in Table II. Using the sum total of the four TABLE II
Garvey die rating [a] of extruded stock

| EPDM, phr. | Hexene copolymer, phr. | Characteristics [b] of extruded strip | | | | |
|---|---|---|---|---|---|---|
| | | Swelling and porosity | Edge | Surface | Corner | Total |
| 100 | 0 | 1 | 1 | 1 | 1 | 4 |
| 90 | 10 | 4 | 2 | 2 | 2 | 10 |
| 80 | 20 | 4 | 3 | 3 | 4 | 14 |
| 70 | 30 | 4 | 4 | 3 | 4 | 15 |
| 50 | 50 | 4 | 4 | 3 | 4 | 15 |
| 30 | 70 | 3 | 3 | 3 | 3 | 12 |
| 10 | 90 | 2 | 3 | 2 | 3 | 10 |
| 0 | 100 | 1 | 2 | 2 | 2 | 7 |

[a] Rating system by method A of ASTM D–2230.
[b] The ratings range from 1 (poor) to 4 (excellent).

EXAMPLE 4

The extrusion behavior of several blends of EPDM and two different hexene copolymers was determined. The EPDM used was "Vistalon 6505" and the hexene copolymers were prepared from hexene and 3 mole percent methyl hexadiene (inherent viscosity 6.5 dl./g.) and hexene and 3 mole percent 1,7-octadiene (inherent viscosity 3.0 dl./g.). The EPDM and hexene copolymers were mixed with 50 phr. ISAF carbon black and 5 phr. zinc oxide in separate Banbury batches (5 min. mixing cycle at 50 r.p.m.). After addition of 2 phr. sulfur, 0.5 phr. Captax, and 1 phr. Tuads to each black stock on a mill, the compounded stocks were milled together so as to have the designated proportions (FIG. 6) of rubbers in the various blends. These stocks were then extruded through a Garvey die as indicated in Example 3. A comparison of the extrusion rates of the various blend compositions is shown in FIG. 6. FIG. 6A shows the influence of the addition of copolymer of hexene and methyl hexadiene on the extrusion rate of "Vistalon 6505." In contrast to the data in Example 3 on blends of "Nordel 1070" and a copolymer of hexene and methyl hexadiene, we observe here a lesser deviation from linear relationship. It should be noted that not only are different EPDM's being evaluated, but also the blends of Example 3 were prepared directly in a Banbury and not obtained by milling. FIG. 6B shows the influence of the addition of the copolymer of hexene and 1,7-octadiene on the extrusion rate of "Vistalon 6505." A nonlinear relationship exists between the extrusion rates and the blend compositions. The two blend compositions containing 50 and 70 phr. hexene copolymer exhibit significantly slower extrusion rates than either the EPDM or the hexene copolymer. A comparison of the Garvey die ratings of the extruded stocks in FIGS. 6A and 6B is shown in Table III. As little as 5 phr. of "Vistalon 6505" increases by 50% the cumulative rating of the blend as compared with the corresponding rating of the copolymer of hexene and methyl hexadiene. Blends containing 30 or 50 phr. "Vistalon 6505" show significantly higher cumulative ratings as compared with that of "Vistalon 6505" alone. The copolymer of hexene and 1,7-octadiene has a reasonably high cumulative rating, which is three times that of the "Vistalon 6505." Blend compositions of the two exhibit even higher cumulative ratings. This is quite surprising.

TABLE III
Garvey die ratings [a] of extruded stock

| EPDM, phr. | Hexene copolymer, phr. FIG. 6A | Hexene copolymer, phr. FIG. 6B | Characteristics [b] of extruded strip | | | | |
|---|---|---|---|---|---|---|---|
| | | | Swelling and porosity | Edge | Surface | Corner | Total |
| 100 | 0 | 0 | 2 | 2 | 2 | 2 | 8 |
| 50 | 50 | | 3 | 3 | 3 | 2 | 11 |
| 30 | 70 | | 3 | 3 | 2 | 2 | 10 |
| 5 | 95 | | 2 | 2 | 1 | 1 | 6 |
| 0 | 100 | | 1 | 1 | 1 | 1 | 4 |
| 50 | | 50 | 3 | 4 | 3 | 4 | 14 |
| 30 | | 70 | 3 | 4 | 4 | 4 | 15 |
| 0 | | 100 | 3 | 3 | 3 | 3 | 12 |

[a] Rating system by method A of ASTM D–2230.
[b] The ratings range from 1 (poor) to 4 (excellent).

ratings as a measure of the quality of the extruded stock, it becomes apparent that all blend compositions have significantly higher cumulative ratings of 10–15 than the corresponding ratings of either EPDM or the hexene copolymer. In particular, the blend compositions containing 20 to 50 phr. of hexene copolymer have very high cumulative ratings. These data relating blend composition and the characteristics of the extruded stock are not predictable.

FIG. 5 shows the influence of the above blend composition on Mooney Viscosity ML 1+4 (212° F.). The observed Mooney Viscosity is also not a linear function of the blend composition.

EXAMPLE 5

The extrusion behavior of several blends of EPDM and α-olefin copolymer was determined. The EPDM used was "Vistalon 6505" and the α-olefin copolymers were (a) a copolymer prepared from hexene and 3 mole percent 1,7-octadiene and (b) a 50/50 blend of a copolymer of decene and 10 mole percent methyl hexadiene and a terpolymer of 50 mole percent pentane, 40 mole percent hexene, and 10 mole percent methyl hexadiene. The EPDM, hexene copolymer, and the α-olefin polymer blend were mixed with 50 phr. ISAF carbon black and 5 phr. zinc oxide in separate Banbury batches (5 min. mix cycle at 50 r.p.m.). The black stocks were milled together so as to have the designated proportions (FIG. 7) of rubbers in the various blends. These stocks were then extruded through a Garvey die as indicated in Example 3. A comparison of the extrusion rates of the various blend compositions is shown in FIG. 7. FIG. 7A shows the influence of the addition of 50-90 phr. of the copolymer of hexene and 1,7-octadiene on the extrusion rate of "Vistalon 6505." Similarly, FIG. 7B shows the influence of the addition of the α-olefin polymer blend on the extrusion rate of "Vistalon 6505." A nonlinear relationship exists between the extrusion rate and the blend compositions in both series. This behavior is not predictable. A comparison of the Garvey die ratings of the extruded stocks in FIGS. 7A and 7B is shown in Table IV. All blend compositions show higher cumulative ratings than that for "Vistalon 6505." Particularly high cumulative ratings are obtained for the compositions based on the α-olefin polymer blend was "Vistalon 6505."

3. The composition of claim 1 wherein the α-olefin of (2)(a) is 1-hexene.

4. The composition of claim 1 wherein the α-olefin of (2)(a) is 1-pentene, 1-hexene, and 1-octene.

5. The composition of claim 1 wherein the α-olefin of (2)(a) is 1-hexene, 1-octene, and 1-decene.

6. The composition of claim 1 wherein the blend ratios are between 80:20 and 20:80 weight percent and the polymer of (2) is poly(1-hexene).

7. The composition of claim 1 wherein the blend ratios are between 80:20 and 20:80 and the α-olefin of (2)(a) is 1-hexene.

8. The composition of claim 1 wherein (1) is an ethylene-propylene-diene rubber containing from about 20-75 weight percent ethylene, from about 80-25 weight percent propylene, and a minor proportion of from about

TABLE IV

Garvey die ratings [a] of extruded stock

| EPDM, phr. | α-Olefin copolymer, phr. FIG. 7A | α-Olefin copolymer, phr. FIG. 7B | Swelling and porosity | Edge | Surface | Corner | Total |
|---|---|---|---|---|---|---|---|
| 100 | | | 2 | 1 | 1 | 1 | 5 |
| 30 | 70 | | 3 | 3 | 2 | 2 | 10 |
| 50 | 50 | | 3 | 2 | 2 | 1 | 8 |
| | 100 | | 2 | 3 | 2 | 3 | 10 |
| 10 | | 90 | 4 | 4 | 3 | 3 | 14 |
| 30 | | 70 | 4 | 3 | 3 | 4 | 14 |
| 50 | | 50 | 4 | 3 | 3 | 4 | 14 |
| | | 100 | 4 | 4 | 4 | 3 | 15 |

[a] Rating system by method A of ASTM D-2230.
[b] The ratings range from 1 (poor) to 4 (excellent).

Suitable (reinforcing and/or nonreinforcing) fillers, fibers, pigments, plasticizers, age resistors, fatty acids and other ingredients known in the art may be used in compounding to modify the processing characteristics, ultimate properties of the finished product, or control cost. Such compounding technology is described in references such as the Vanderbilt Rubber Handbook, R. T. Vanderbilt Company, Inc., 1968; Technical Report on Nordel, E. I. du Pont de Nemours and Company, Inc., 1964; Introduction to Rubber Technology, M. Morton, Editor, Reinhold Publishing Corp., 1959; Impregnated Glass Fiber Rubber Reinforcement, A. Marzocchi, Rubber Division Meeting of The American Chemical Society, October, 1970.

While certain representative embodiments and details have been shown for the purpose of illustrating the invention, it will be apparent to those skilled in this art that various changes and modifications may be made therein without departing from the spirit or scope of the invention.

What is claimed is:

1. A rubbery composition comprising a blend of between 95:5 and 5:95 weight percent of (1) ethylene-propylene rubber consisting of from about 20 to 75 weight percent of ethylene and from about 80 to 25 weight percent propylene or ethylene-propylene-diene rubber consisting of from about 20 to 75 weight percent ethylene, from about 80 to 25 weight percent propylene, and a minor proportion of from about 1 to 15 weight percent of a $C_5$-$C_{30}$ nonconjugated diene, and (2) a rubbery polymer consisting of (a) at least 80 weight percent of at least one $C_5$-$C_{10}$ α-olefin and (b) up to 20 weight percent of at least one $C_5$-$C_{30}$ non-conjugated polyene.

2. The composition of claim 1 wherein the polymer of (2) is poly(1-hexene).

1-15 weight percent of a $C_5$-$C_{30}$ nonconjugated diene or polyene.

9. The composition of claim 1 wherein (1) is an ethylene-propylene-diene rubber containing from about 20-75 weight percent ethylene, from about 80-25 weight percent propylene, and a minor proportion of from about 1-15 weight percent of a $C_5$-$C_{30}$ nonconjugated diene or polyene, and wherein the polymer of (2) is poly(1-hexene).

10. The composition of claim 1 wherein (1) is an ethylene-propylene-diene rubber containing from about 20-75 weight percent ethylene, from about 80-25 weight percent propylene, and a minor proportion of from about 1-15 weight percent of a $C_5$-$C_{30}$ nonconjugated diene or polyene, and wherein the α-olefin of (2)(a) is 1-hexene.

11. The composition of claim 1 wherein (1) is an ethylene-propylene-diene rubber containing from about 20-75 weight percent ethylene, from about 80-25 weight percent propylene, and a minor proportion of from about 1-15 weight percent of a $C_5$-$C_{30}$ nonconjugated diene or polyene, and wherein the α-olefin of (2)(a) is 1-hexene, 1-octene, and 1-decene.

References Cited
UNITED STATES PATENTS

| 3,514,417 | 5/1970 | Bickel et al. | 260—27 |
| 3,299,183 | 1/1967 | Borghese | 260—897 |
| 3,477,957 | 11/1969 | Hall | 252—59 |
| 3,456,038 | 7/1969 | Newman et al. | 260—878 |

JOHN C. BLEUTGE, Primary Examiner

C. J. SECCURO, Assistant Examiner

U.S. Cl. X.R.

260—41 B, 41R

PO-1050
(5/69)

UNITED STATES PATENT OFFICE
CERTIFICATE OF CORRECTION

Patent No. 3,794,696      Dated February 26, 1974

Inventor(s) Joginder Lal and Paul H. Sandstrom

It is certified that error appears in the above-identified patent and that said Letters Patent are hereby corrected as shown below:

Column 5, line 67, "of hexene copolymer" should read -- of the hexene copolymer --.

Column 6, line 69, "pentane" should read -- pentene --.

Column 7, line 17, "blend was 'Vistalon 6505.'" should read -- blend and "Vistalon 6505." --

Signed and sealed this 3rd day of December 1974.

(SEAL)
Attest:

McCOY M. GIBSON JR.
Attesting Officer

C. MARSHALL DANN
Commissioner of Patents